United States Patent [19]

Döring

[11] Patent Number: 5,419,640
[45] Date of Patent: May 30, 1995

[54] ADJUSTABLE SUPPORT FOR JOURNALS AND HINGE PINS, ESPECIALLY FOR USE WITH DOORS AND GATES

[76] Inventor: Erich Döring, Im Hölzeli, CH 9442 Berneck, Switzerland

[21] Appl. No.: 190,033
[22] PCT Filed: Jun. 4, 1993
[86] PCT No.: PCT/EP93/01415
§ 371 Date: Jan. 28, 1994
§ 102(e) Date: Jan. 28, 1994
[87] PCT Pub. No.: WO93/25789
PCT Pub. Date: Dec. 23, 1993

[30] Foreign Application Priority Data
Jun. 5, 1992 [DE] Germany ............ 42 18 639.0

[51] Int. Cl.⁶ ............................ F16C 23/02
[52] U.S. Cl. .................. 384/260; 384/255; 384/258
[58] Field of Search ........... 384/260, 255, 258, 247, 384/252, 259

[56] References Cited

U.S. PATENT DOCUMENTS

| | | |
|---|---|---|
| 1,787,017 | 6/1926 | Paul . |
| 2,730,413 | 1/1956 | Smith .................... 384/260 |
| 4,780,000 | 10/1988 | Lewis et al. ............ 384/258 |

FOREIGN PATENT DOCUMENTS

| | | |
|---|---|---|
| 2646201 | 10/1990 | France . |
| 3743858 | 7/1989 | Germany . |
| 4032808 | 4/1992 | Germany . |
| 8904906 | 6/1989 | WIPO . |

*Primary Examiner*—Lenard A. Footland
*Attorney, Agent, or Firm*—Kenyon & Kenyon

[57] ABSTRACT

An adjustable support for journals and hinge pins, especially for use with doors and gates. A rotary member (14) including an eccentrically positioned receiving bore (16) to take up a journal or hinge pin is supported so as to be rotatably adjustable in a bearing bore (12) of a bearing block (10). A setscrew (22) extending transversely of the bearing bore (12), passing through the same, is held for rotation in the bearing block (10) but fixed against axial displacement. The setscrew (22) touches the rotary member (14) such that a toothing of the type of a worm gear forms in the rotary member (14) as the setscrew (22) is turned.

5 Claims, 2 Drawing Sheets

Fig. 1
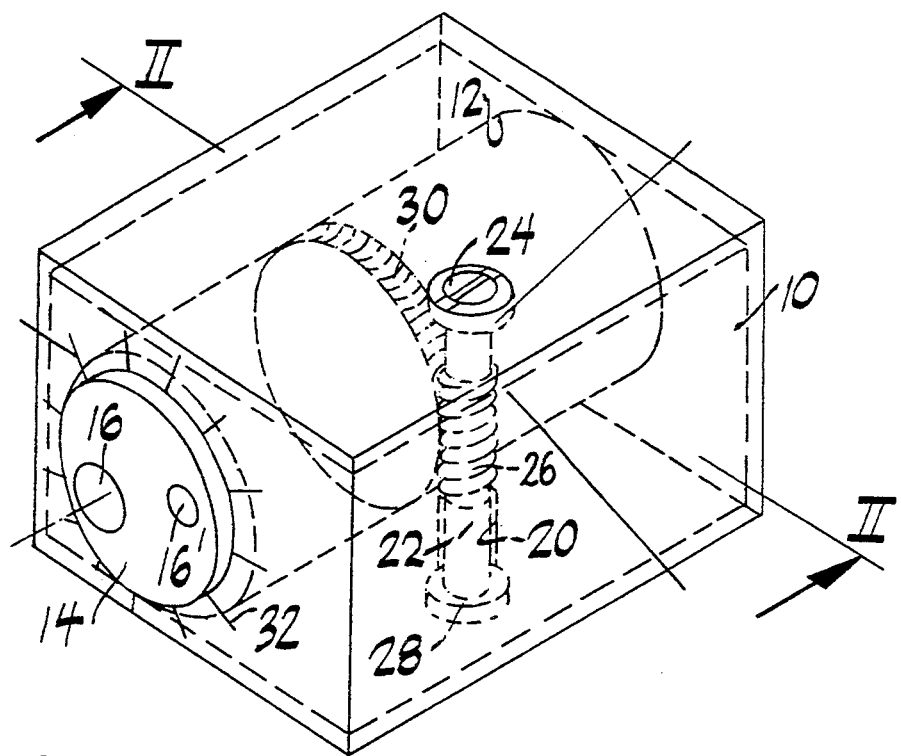
Fig. 3
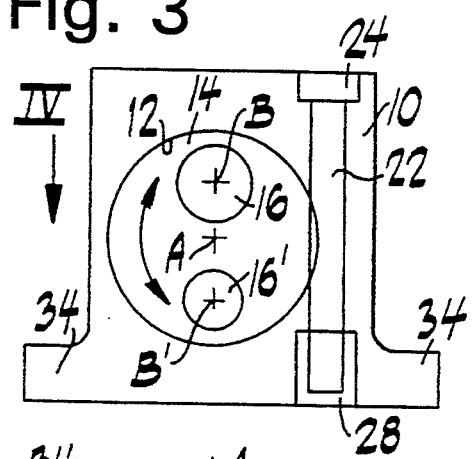
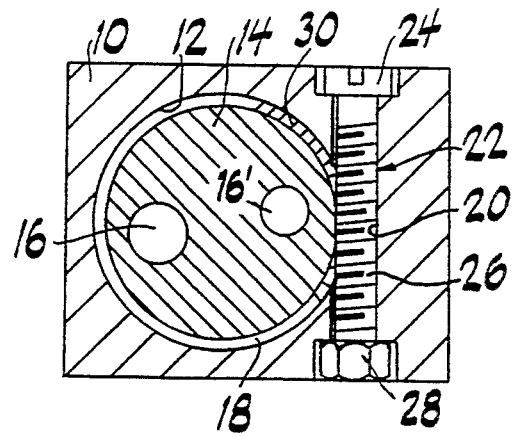
Fig. 2
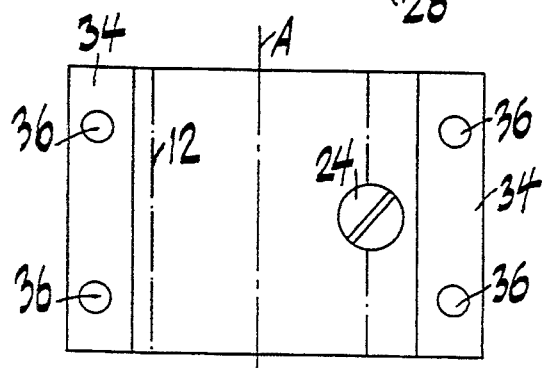
Fig. 4

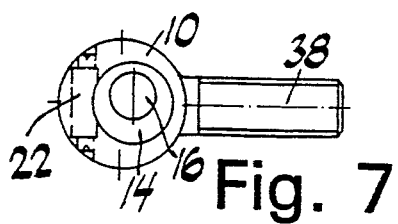
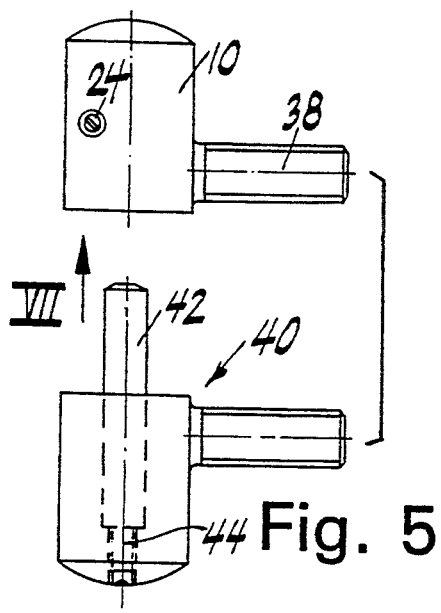
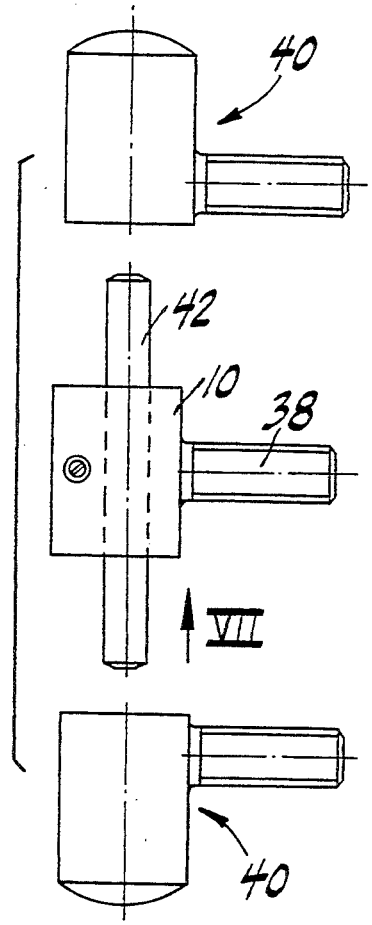
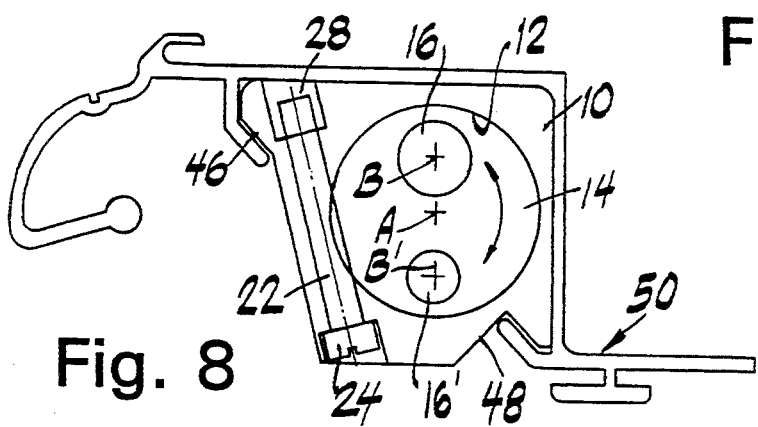
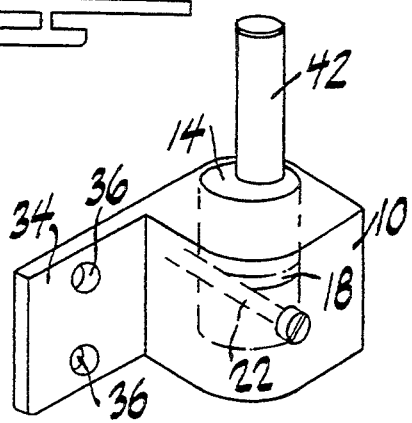

ADJUSTABLE SUPPORT FOR JOURNALS AND HINGE PINS, ESPECIALLY FOR USE WITH DOORS AND GATES

The invention relates to an adjustable support for journals and hinge pins, especially for use with doors and gates.

Sectional gates composed of a plurality of hingedly interconnected panels disposed above or beside one another normally include bearing blocks screwed into the panels, for guide rolls. The bearing blocks have elongated holes in horizontal and/or vertical directions so that the axial position of the guide rolls can be adapted to different local conditions. For adjustment of the guide rolls, usually four screws must be loosened in each of the bearing blocks, then the bearing block is moved into the desired position, normally by hitting it lightly with a hammer, and then the screws must be tightened again. If a sectional gate comprises five panels, for instance, this means that a total of fourty screws must be loosened and retightened. In tightening the screws, frequently the desired adjustment of the bearing block once more suffers a little change so that the adjusting procedure must be repeated.

The same is true of adjustable articulations between the panels of sectional gates and of joints provided on doors and gates, also referred to as hinges.

It is the object of the invention to provide a support for journals and hinge pins which is adjustable more easily and sensitively.

This object is met, according to the invention, by a support having the features of claim 1.

The means of support according to the invention is prepared in such a way that the rotary member is pushed into the bearing bore of the bearing block in any random angular position of rotation, and then the setscrew is threaded in. To facilitate that, the bearing block preferably comes prepared with a transverse bore of greater diameter than the outer diameter of the screw thread. As the setscrew is entered by turning it, the courses of its thread cut into the rotary member. Subsequently the setscrew is fixed in a certain axial position, for example by threading a nut on the screw or by snap engaging a retaining ring.

Having mounted a support means according to the invention, for instance on a panel of a sectional gate or on a leaf of a door or gate or a door casing or gate post, the screw is turned, as required, so that it will move the rotary member together with the journal or hinge pin inserted in it into the desired position. On that occasion the thread courses formed in the rotary member during assembly of the support gradually add up to a worm gear. The rotary member can be rotated through an angle of any desired size and the receiving bore with which it is formed, at the same time, adopts different positions depending on its arrangement with respect to the central bore. The receiving bore, for example, is designated for a journal which supports a roller. Instead, the receiving bore can take up a hinge pin of a hinge on a door or gate. This hinge pin either can be supported for rotation in the rotary member or fixed against rotation therein.

Advantageous further developments of the invention may be gathered from the subclaims.

An embodiment of the invention will be described in greater detail below, with reference to diagrammatic drawings, in which:

FIG. 1 is a perspective view of a first embodiment of a support according to the invention;

FIG. 2 shows the cross section II—II of FIG. 1;

FIG. 3 is a front elevational view, corresponding to FIG. 2, showing a second embodiment;

FIG. 4 shows a view in the direction of arrow IV in FIG. 3;

FIG. 5 is a side elevational view of a third embodiment;

FIG. 6 is a side elevational view of a fourth embodiment;

FIG. 7 shows the view in the direction of arrow VII in FIGS. 5 and 6;

FIG. 8 is a view corresponding to FIG. 2 of a fifth embodiment; and

FIG. 9 is a perspective view of a sixth embodiment of the invention.

All the embodiments illustrated of a supporting means according to the invention comprise a bearing block 10 shown to be a rectangular prism in FIGS. 1 and 2. The bearing block 10 has a bearing bore 12 which defines a central axis A. Inside the bearing bore 12, a rotary member 14 is supported which has at least one eccentric receiving bore 16, but is provided with two such bores 16 and 16' of different diameters in FIGS. 1 to 4 and 8. A journal or hinge pin can be pushed selectively into one or the other of these receiving bores 16 and 16' and secured inside the same against rotation and/or axial displacement, if necessary. The geometric axes of the receiving bores 16 and 16', hereinafter designated receiving bores B and B', respectively, each extend spaced from and parallel to the central axis A. The location of the receiving bores B and B' depends on the rotational angular position of the rotary member 14.

An annular groove 18 is formed in the rotary member 14 approximately in the middle between the ends thereof. The bearing block 10 has a transverse bore 20 penetrating the bearing bore 12 in the area of the annular groove 18 and receiving a setscrew 22. The setscrew 22 is a commercially available screw having a head 24 and a thread 26. The outer diameter of the thread 26 is dimensioned such that the setscrew 22 is received substantially without clearance in the transverse bore 20 yet is freely rotatable therein so that the thread 26 cuts into the annular groove 18 formed in the rotary member 14. A self-locking nut 28 is threaded on the end of the setscrew 22, whereby the setscrew is supported in axial direction, substantially without clearance, in the bearing block 10 and can be turned together with the nut 28.

Turning of the setscrew 22 gradually creates a toothing 30 of the type of worm gears in the annular groove 18. To accomplish that by a moderate torque being exerted, for instance, by means of a screw driver on the head 24 of the setscrew 22, the rotary member 14 preferably is made of relatively soft metal, such as aluminum or a zinc casting or of polyamide or polyurethane or another suitable plastic, provided these are not too hard. A scale 32 may be formed in the front end of the bearing block 10, as shown in FIG. 1. This will make it easier to rotate the rotary member 14 in reproducible fashion into certain angular positions.

According to FIGS. 3 and 4 the bearing block 10 includes a pair of flanges 34 having fastening apertures 36 for fixing it to a door leaf or panel or to a door casing, door post, and the like.

In the case of the embodiments shown in FIGS. 5 to 7, a support means according to the invention forms part of a so-called joint or hinge of known outward appearance. The bearing block 10 has a cylindrical outer surface from which a threaded pin 38 protrudes for fastening to a door leaf or the like. As shown in FIG. 5, the support according to the invention forms the upper half of a two-part door hinge, cooperating with a commercially available lower part 40 in which a cylindrical hinge pin 42 is received. The hinge pin 42 is adjustable in height by means of another setscrew 44 and fits into the receiving bore 16 of the rotary member 14. The bearing block 10, and with it the door leaf it supports, can be adjusted horizontally in the plane of the door leaf, within the corresponding door frame, and at right angles to the same by turning the setscrew 22. Turning of the other setscrew 44 permits additional adjustment in height of the bearing block 10 and, therefore, also of the door leaf it supports.

In FIG. 6 the support according to the invention presents the central member of a three-part door joint, with a corresponding longer hinge pin 42 projecting upwardly and downwardly from the receiving bore 16 of the rotary member 14 so as to engage in two commercially available hinge parts 40 when mounted.

The embodiment according to FIG. 8 differs from the one illustrated in FIGS. 1 and 2 in that the bearing block 10 is given the configuration of an asymmetrical prism having a shoulder 46 and a groove 48 and is adapted to be slipped into a sectional extruded member 50.

Also in the case of the embodiment according to FIG. 9 the bearing block 10 has an asymmetrical profile. But it includes a flange 34 which is formed with fastening apertures 36.

What is claimed is:

1. An adjustable support for journals and hinge pins, comprising
 a bearing block (10) formed with a bearing bore (12) which has a central axis (A),
 a rotary member (14) which is supported in the bearing bore (12) for rotational adjustment about the central axis (A),
 at least one receiving bore (16) formed in the rotary member (14) to receive a journal or hinge pin (42) and having a receiving axis (B) which differs from the central axis (A), and
 a setscrew (22) which is oriented in transverse direction of the bearing bore (12), passing through the same, and extends through the bearing block (10) in which it is rotatable but fixed against axial displacement and touches the rotary member (14),
 so that a toothing (30) of the type of a worm gear forms in the rotary member (14) when the setscrew (22) is turned, and the rotary motion of the setscrew (22) is transferable through this toothing (30) to the rotary member (14) for adjustment thereof.

2. The support as claimed in claim 1, characterized in that the receiving axis (B) extends parallel to the central axis (A).

3. The support as claimed in claim 1, characterized in that the receiving axis (B) extends at an acute angle with respect to the central axis (A).

4. The support as claimed in any one of claims 1 to 3, characterized in that the rotary member (14) comprises at least a portion of a prepared annular groove (18) in which the worm gear type toothing (30) is formed upon turning of the setscrew (22).

5. The support as claimed in any one of claims 1 to 3, characterized in that the rotary member (14) comprises two or more receiving bores (16, 16') of different diameters and/or at different spacings from the central axis (A).

* * * * *